United States Patent
Murata

(10) Patent No.: US 8,348,439 B2
(45) Date of Patent: Jan. 8, 2013

(54) PROJECTION DISPLAY SYSTEM

(75) Inventor: Taisuke Murata, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 234 days.

(21) Appl. No.: 12/849,447

(22) Filed: Aug. 3, 2010

(65) Prior Publication Data

US 2011/0134395 A1 Jun. 9, 2011

(30) Foreign Application Priority Data

Dec. 7, 2009 (JP) .................................. 2009-277656

(51) Int. Cl.
*G03B 21/14* (2006.01)

(52) U.S. Cl. .............. 353/119; 353/31; 353/34; 353/74; 353/79; 353/98; 353/99; 353/122

(58) Field of Classification Search .................... 353/31, 353/34, 74, 79, 84, 98, 99, 119, 122; 359/456–457, 359/443, 449, 453, 460, 742, 27; 372/4–6, 372/21–25, 35, 39, 68; 362/259, 553, 230–231, 362/293, 84; 349/5, 7, 8, 9
See application file for complete search history.

(56) References Cited

U.S. PATENT DOCUMENTS

| | | | | |
|---|---|---|---|---|
| 5,398,086 A | * | 3/1995 | Nakano et al. .................. | 353/31 |
| 6,558,008 B1 | * | 5/2003 | Salerno et al. ................. | 353/122 |
| 6,908,198 B2 | * | 6/2005 | Shiraishi et al. ................ | 353/60 |
| 7,059,732 B2 | * | 6/2006 | Oross et al. .................... | 353/119 |
| 7,118,231 B2 | * | 10/2006 | Yamamoto et al. ........... | 353/119 |
| 7,443,657 B2 | * | 10/2008 | Gitzinger et al. ........ | 361/679.27 |
| 7,445,342 B2 | * | 11/2008 | Garg .............................. | 353/79 |
| 7,771,057 B2 | * | 8/2010 | Combs et al. ................. | 353/119 |
| 8,052,308 B2 | * | 11/2011 | Kamijima ..................... | 362/293 |
| 2004/0263799 A1 | * | 12/2004 | Lim ................................ | 353/61 |
| 2007/0091286 A1 | * | 4/2007 | Davis et al. .................... | 353/122 |

FOREIGN PATENT DOCUMENTS

| | | |
|---|---|---|
| JP | 2005-98001 A | 4/2005 |
| JP | 3883729 B2 | 2/2007 |

* cited by examiner

*Primary Examiner* — Georgia Y Epps
*Assistant Examiner* — Sultan Chowdhury
(74) *Attorney, Agent, or Firm* — Birch, Stewart, Kolasch & Birch, LLP

(57) ABSTRACT

An enclosure of a dichroic mirror system that synthesizes a plurality of monochromatic laser beams emitted from a laser light source to output synthesized light is a structure having a dichroic mirror system lower enclosure and a dichroic mirror system upper enclosure joined to each other, and includes a light-leakage protecting structure that is formed by a convex portion formed at an end of the dichroic mirror system lower enclosure and a concave portion formed at an end of the dichroic mirror system upper enclosure engaged with each other at a joint therebetween.

6 Claims, 5 Drawing Sheets

PROJECTION DISPLAY SYSTEM

BACKGROUND OF THE INVENTION

1. Field of the Invention

The present invention relates to a projection display system having a light source and a projection device mounted thereon.

2. Description of the Related Art

Conventionally, there are projection display systems that form an optical image according to an image signal using a display device based on light from a light source, and enlargedly projects the formed optical image on a screen through a projection lens, to obtain a large-screen image. The conventional projection display system includes a white light source such as a mercury lamp as a light source, in which a color-separating optical filter separates light into a plurality of monochromatic light components such as red, green, and blue, thereby realizing videos in full colors. Some of recent systems use a laser such as a semiconductor laser as a light source, instead of the while light source, on which a plurality of monochromatic lasers are mounted, thereby realizing images in full colors.

When laser light is used as the light source, it is necessary to prevent leakage of scattered light generated on surfaces of a mirror, a lens, and the like to ensure security of human bodies or objects. Prevention of light leakage is also useful in efficiently using light. Areas where light leakage occurs include a gap generated at a joint between components constituting an enclosure of a light source device or a projection device. A conventional technique related to countermeasures against light leakage from a gap is disclosed in Japanese Patent Application Laid-open No. 2005-098001.

However, application of the technique disclosed in Japanese Patent Application Laid-open No. 2005-098001 is limited to sliding doors. Furthermore, this technique is aimed not at laser light but at illumination light, and accordingly light shielding is not so strict. Therefore, the technique disclosed in Japanese Patent Application Laid-open No. 2005-098001 cannot prevent leakage of light from the gap generated at the joint between the components constituting the enclosure of the light source device or the projection device.

SUMMARY OF THE INVENTION

DETAILED DESCRIPTION OF THE PREFERRED EMBODIMENTS

Exemplary embodiments of a projection display system according to the present invention will be explained below in detail with reference to the accompanying drawings. The present invention is not limited to the embodiments.

Figure 1:
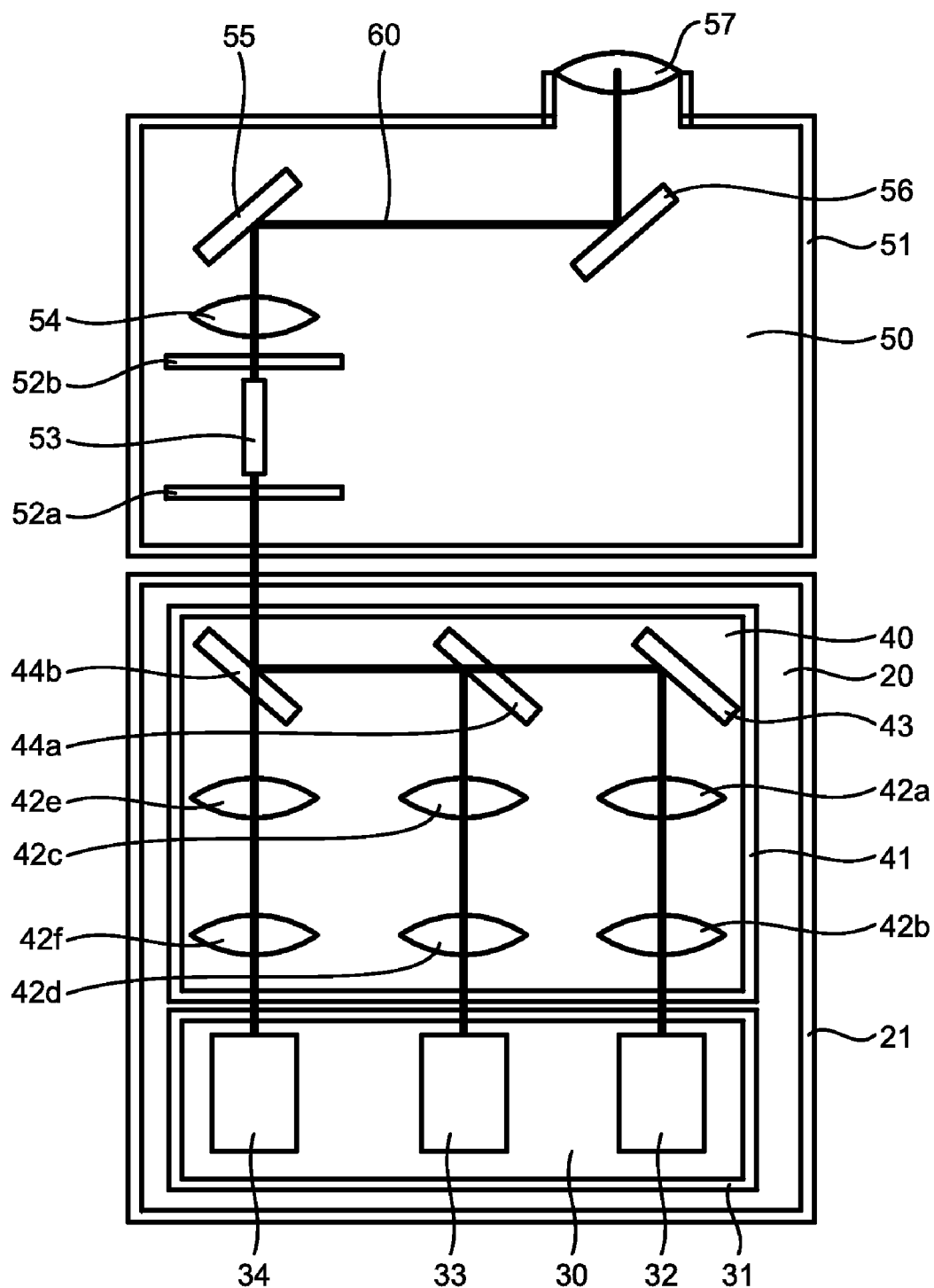
FIG. 1 depicts a general configuration of a projection display system according to a first embodiment of the present invention.

FIG. 1 depicts a general configuration of a projection display system according to a first embodiment of the present invention. The projection display system according to the first embodiment includes a light source device 20 including a laser source 30 and a dichroic mirror system 40, and a projection device 50. The laser source 30 emits a plurality of monochromatic laser beams of different colors. The dichroic mirror system 40 synthesizes the plural monochromatic laser beams emitted by the laser source 30 to emit synthesized light. The light emitted from the light source device 20 is input to the projection device 50, and then the projection device 50 enlargedly projects light (an optical image) generated by illuminating an internal small display element. The light emitted from the laser source 30 travels along an optical path 60, is synthesized by the dichroic mirror system 40, enters the projection device 50, and is projected.

The laser source 30 includes a green laser 32, a red laser 33, and a blue laser 34. The green laser 32 emits a green monochromatic light beam. The red laser 33 emits a red monochromatic light beam. The blue laser 34 emits a blue monochromatic light beam. The green laser 32, the red laser 33, and the blue laser 34 are accommodated in a laser source enclosure 31. The laser light source 30 emits monochromatic light beams of three, that is, green, red, and blue colors, and causes the light beams to enter the dichroic mirror system 40.

The dichroic mirror system 40 includes lenses 42a to 42f, a reflective mirror 43, and dichroic mirrors 44a and 44b. The lenses 42a and 42b deal with green light, the lenses 42c and 42d deal with red light, and the lenses 42e and 42f deal with blue light. The lenses 42a to 42f convert diameters of incident laser beams to obtain parallel light. The reflective mirror 43 reflects incident green light. The dichroic mirrors 44a and 44b reflect light of specific wavelengths and transmit light of the other wavelengths. The dichroic mirror 44a transmits green light and reflects red right to synthesize the red light and the green light. The dichroic mirror 44b reflects green light and red light and transmits blue light to synthesize the green light, the red light, and the blue light, thereby synthesizing the monochromatic light beams of three colors incident on the dichroic mirror system 40. These components are accommodated in the dichroic mirror system enclosure 41.

The laser source 30 and the dichroic mirror system 40 are accommodated in a light-source device enclosure 21.

The projection device 50 includes diffusers 52a and 52b, a rod 53, a lens 54, a reflective mirror 55, a display element 56, and a projection lens 57. The diffusers 52a and 52b transmit light while diffusing part of the light to reduce scintillation. The rod 53 uniformizes light intensity distribution of emission light. The reflective mirror 55 reflects incident light. The lens 54 transmits incident light and illuminates the display element 56. These components are accommodated in a projection device enclosure 51. The light incident from the light source device 20 passes through the diffusers 52a and 52b and the rod 53, passes through the lens 54, and then is reflected on the reflective mirror 55 to reach the display element 56. The display element 56 is a light modulating element, and spatially modulates the light from the light source device 20 based on image information to generate image light (an optical image) corresponding to the image information. In the first embodiment, a digital micro-mirror device (DMD) is applied as the display element 56. A light modulating element other than the DMD (a reflective liquid-crystal display element, for example) can be also applied as the display element 56. The reflective light modulating element is not always required and a transmissive light modulating element (such as a transmissive liquid-crystal display element) can be also applied.

The image light output from the display element 56 is enlargedly projected by the projection lens 57.

On the optical path 60, scattering occurs on surfaces of the diffusers, the lenses, and the mirrors in the dichroic mirror system 40 and the projection device 50, and scattered light is generated.

An example in which the dichroic mirror system enclosure 41 includes a light-leakage protecting structure 10 is explained below. The present invention can be similarly applied to a case where the laser source enclosure 31 or the light-source device enclosure 21 includes the light-leakage protecting structure 10. It is also possible to provide light-leakage protecting structures for at least two of the light-source device enclosure 21, the laser source enclosure 31, and the dichroic mirror system enclosure 41.

Figure 2:
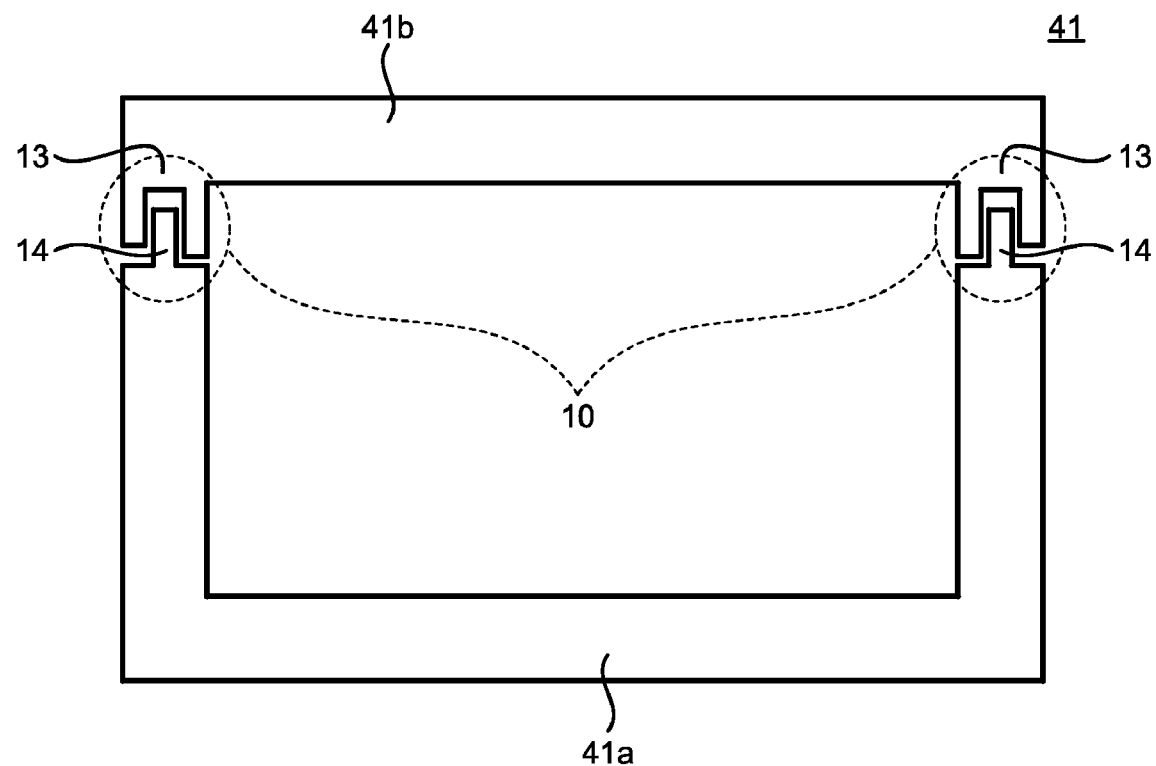
FIG. 2 is a vertical cross section of a dichroic mirror system enclosure.

FIG. 2 is a vertical cross section of the dichroic mirror system enclosure 41. The dichroic mirror system enclosure 41 includes a dichroic mirror system lower enclosure 41a and a dichroic mirror system upper enclosure 41b. The dichroic mirror system lower enclosure 41a constitutes a lower part of the dichroic mirror system enclosure 41 and holds constituent members thereof. The dichroic mirror system upper enclosure 41b constitutes an upper part of the dichroic mirror system enclosure 41 and functions as a cover of the dichroic mirror system lower enclosure 41a. The dichroic mirror system lower enclosure 41a and the dichroic mirror system upper enclosure 41b form the light-leakage protecting structure 10 at a joint therebetween with a concave portion 13 and a convex portion 14 caused to butt with each other.

Figure 3:
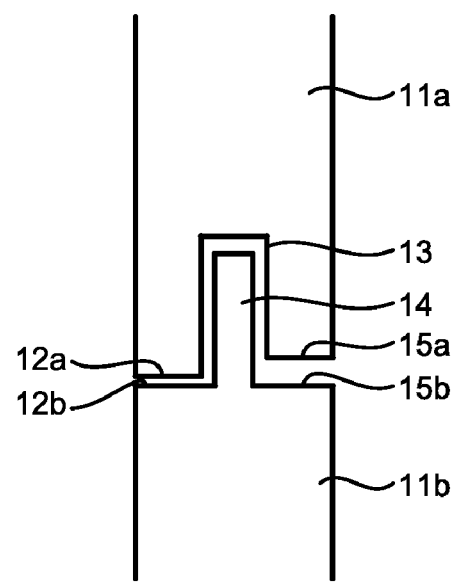
FIG. 3 depicts a detailed configuration of a light-leakage protecting structure.

FIG. 3 depicts a detailed configuration of the light-leakage protecting structure 10. In the light-leakage protecting structure 10, a concave-side end 11a having the concave portion 13 formed like a groove is caused to butt with a convex-side end 11b having the convex portion 14 formed like a rib, so that the convex portion 14 and the concave portion 13 are engaged with each other. On the concave-side end 11a, a concave-side inner flat portion 12a, the concave portion 13, and a concave-side outer flat portion 15a are provided in this order from inside of the enclosure. On the convex-side end 11b, a convex-side inner flat portion 12b, the convex portion 14, and a convex-side outer flat portion 15b are provided in this order from inside of the enclosure. The concave portion 13 and the convex portion 14 prevent scattered light entering between the concave-side end 11a and the convex-side end 11b from passing directly to outside of the enclosure. The scattered light entering through a gap between the concave-side inner flat portion 12a and the convex-side inner flat portion 12b is blocked by the convex portion 14, and is scattered or reflected. Therefore, light to be output from the enclosure through a gap between the concave-side outer flat portion 15a and the convex-side outer flat portion 15b is repeatedly scattered or reflected between the concave portion 13 and the convex portion 14 and is attenuated. In this way, leakage of light from the joint between the concave-side end 11a and the convex-side end 11b can be considerably reduced.

The light-leakage protecting structure 10 can reduce the scattered light entering between the concave-side end 11a and the convex-side end 11b to further reduce the light leakage by causing the concave-side inner flat portion 12a and the convex-side inner flat portion 12b formed inside of the enclosure to abut on each other and closing the portions inside of the enclosure. A small gap can be generated between the concave portion 13 and the convex portion 14 or between the concave-side outer flat portion 15a and the convex-side outer flat portion 15b to cause the concave-side inner flat portion 12a and the convex-side inner flat portion 12b to securely abut on each other, as shown in FIG. 3. That is, while the enclosure can be formed not to generate a gap outside of the enclosure to prevent detraction from the appearance, a gap can be provided outside of the enclosure as shown in FIG. 3 to diminish the inner gap of the enclosure to reduce the light leakage.

Figure 4:
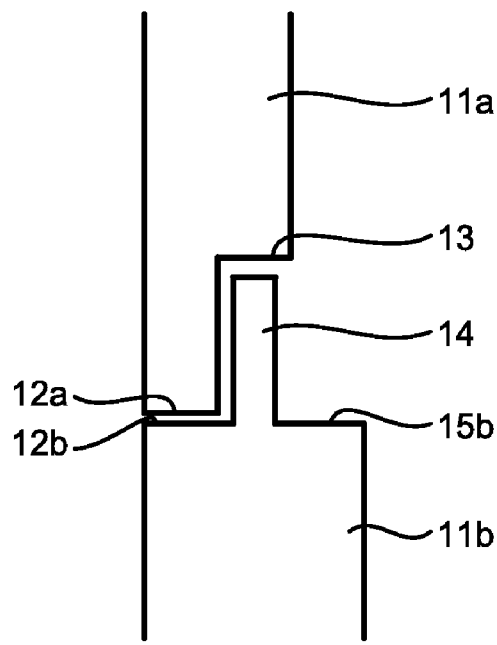
FIG. 4 depicts another detailed configuration of the light-leakage protecting structure.
Figure 5:
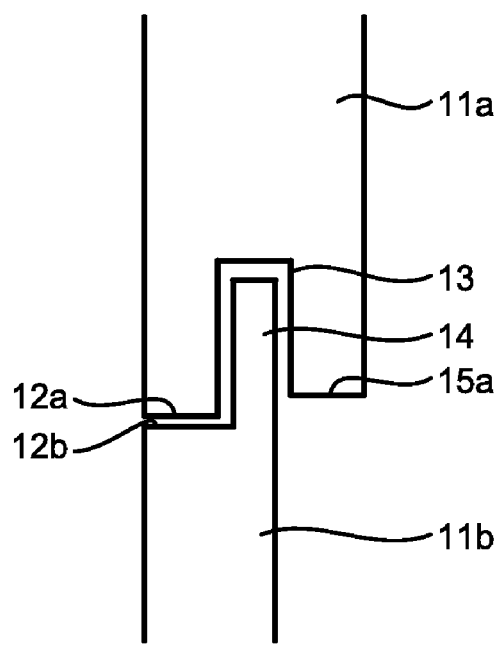
FIG. 5 depicts still another detailed configuration of the light-leakage protecting structure.
Figure 6:
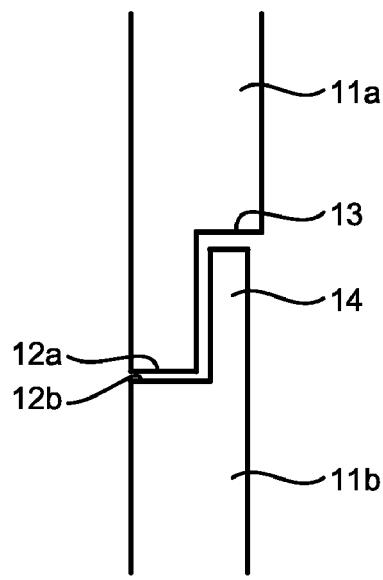
FIG. 6 depicts still another detailed configuration of the light-leakage protecting structure.

The light-leakage protecting structure 10 is not limited to the configuration shown in FIG. 3. The light-leakage protecting structure 10 can have a configuration without one or both of the concave-side outer flat portion 15a and the convex-side outer flat portion 15b. FIGS. 4 to 6 are other configuration examples of the light-leakage protecting structure. FIG. 4 depicts a configuration without the concave-side outer flat portion 15a. FIG. 5 depicts a configuration without the convex-side outer flat portion 15b. FIG. 6 depicts a configuration without the concave-side outer flat portion 15a and the convex-side outer flat portion 15b. Even in the configurations without the concave-side outer flat portion 15a or the convex-side outer flat portion 15b, incident scattered light is blocked by the convex portion 14 so that light to be output to outside of the enclosure is repeatedly scattered or reflected between the concave portion 13 and the convex portion 14 and is attenuated. Therefore, a light-leakage protection effect can be achieved like in the configuration as shown in FIG. 3.

When the dichroic mirror system enclosure 41 includes three or more members, a similar structure to the light-leakage protecting structure 10 is provided at each joint therebetween.

A projection display system according to a second embodiment of the present invention has the same configuration as that of the first embodiment as shown in FIG. 1, and includes the light source device 20 and the projection device 50. In the second embodiment, the light-leakage protecting structure 10 included in the dichroic mirror system enclosure 41 in the first embodiment is included in the projection device enclosure 51.

Figure 7:
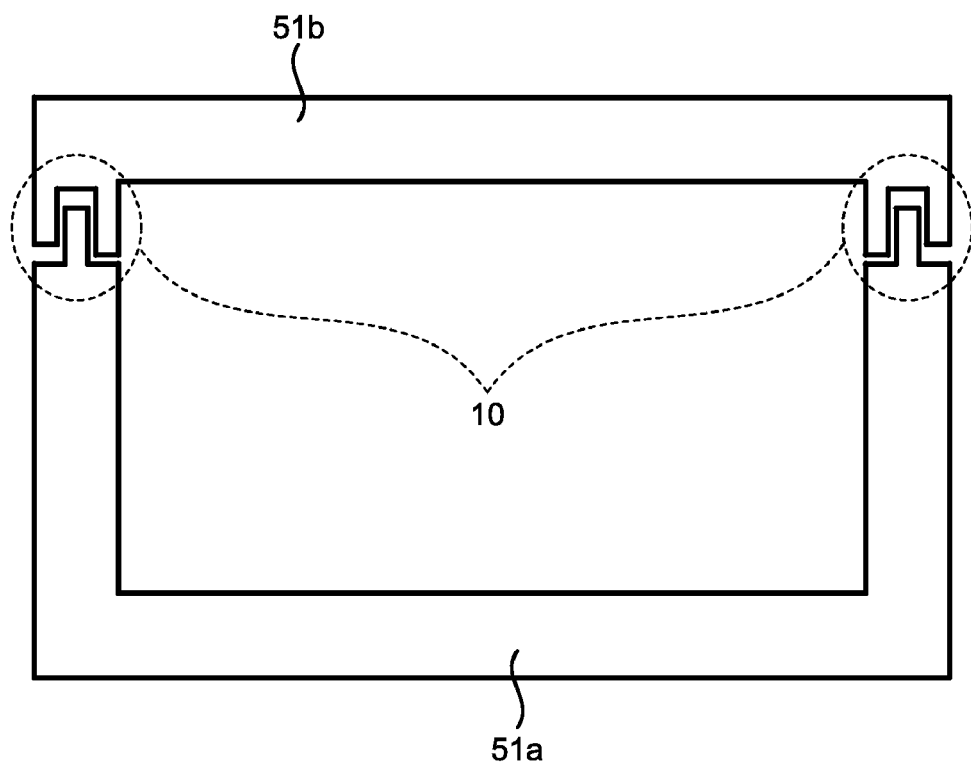
FIG. 7 is a vertical cross section of a projection device enclosure according to a second embodiment of the present invention.

FIG. 7 is a vertical cross section of the projection device enclosure 51 according to the second embodiment. The projection device enclosure 51 includes a projection-device lower enclosure 51a and a projection-device upper enclosure 51b. The projection-device lower enclosure 51a constitutes a lower part of the projection device enclosure 51. The projection-device upper enclosure 51b constitutes an upper part of the projection device enclosure 51. The projection-device lower enclosure 51a and the projection-device upper enclosure 51b form the light-leakage protecting structure 10 at a joint therebetween.

While scattered light generated in the projection device 50 enters the joint between the projection-device lower enclosure 51a and the projection-device upper enclosure 51b, the light-leakage protecting structure 10 greatly attenuates light to be output therefrom, and accordingly light leakage from the joint can be prevented.

When the projection device enclosure 51 includes three or more members, it suffices that the light-leakage protecting structure 10 is provided at each joint therebetween.

Figure 8:
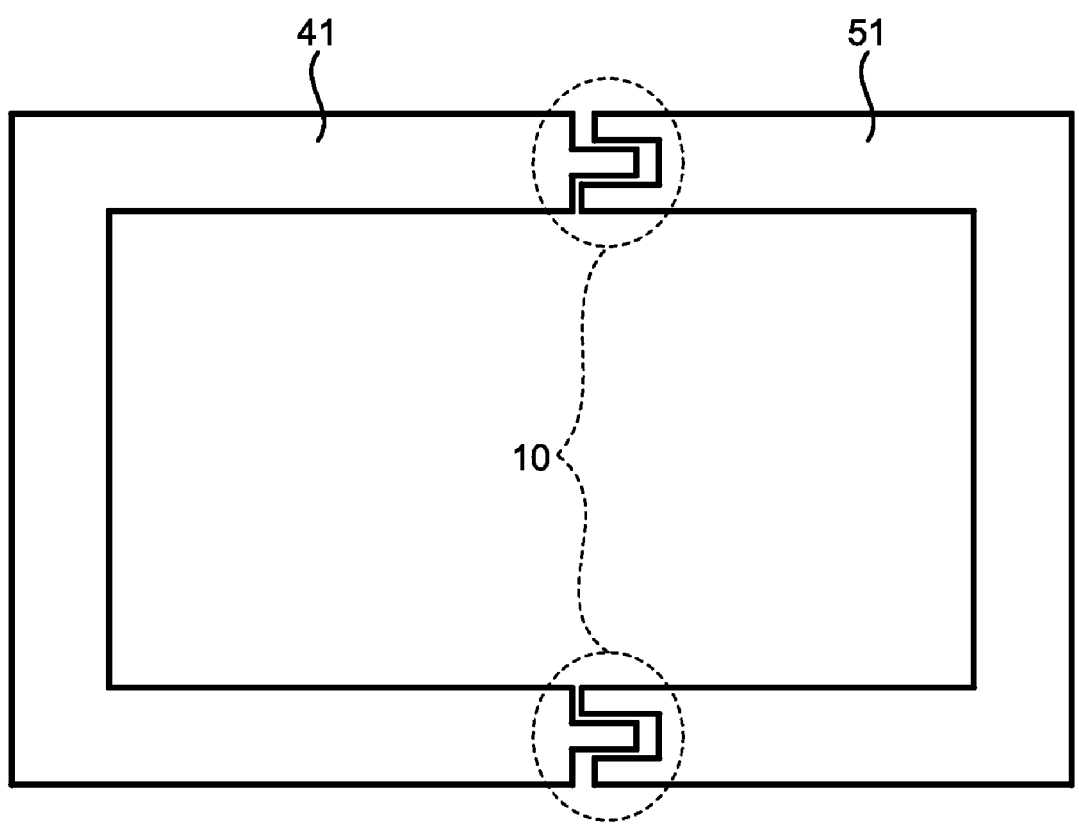
FIG. 8 depicts a general configuration of a projection display system according to a third embodiment of the present invention.

A projection display system according to a third embodiment of the present invention has the same configuration as that of the first and second embodiments, and light emitted from a light source device is projected by a projection device. In the third embodiment, the light source device and the projection device are connected to each other. Specifically, the dichroic mirror system enclosure 41 and the projection device enclosure 51 are connected as shown in FIG. 8. The light-leakage protecting structure 10 is formed at a joint between the dichroic mirror system enclosure 41 and the projection device enclosure 51.

The light-leakage protecting structure 10 greatly reduces light leakage from the joint between the dichroic mirror system enclosure 41 and the projection device enclosure 51. A mechanism that prevents the light leakage is the same as that in the first or second embodiment, and thus redundant explanations thereof will be omitted.

The embodiments explained above are examples of the present invention. The present invention is not limited thereto and various modifications can be made. In the embodiments, configurations in which many optical components are placed on an optical path to synthesize monochromatic light beams of three, that is, green, red, and blue colors, and accordingly scattered light is easily generated are explained as the examples. However, the present invention can be applied to a configuration that does not perform the synthesis of monochromatic light beams, for example. The light-leakage protecting structure can be provided in both of the light source device and the projection device. The light-leakage protecting structure can have a plurality of convex portions and a plurality of concave portions engaged with the convex portions. In this manner, the present invention can include various modifications.

According to the present invention, light leakage from a gap generated at a joint between components constituting the enclosure of a light source or a projection device can be prevented. Therefore, security of human bodies or objects can be ensured and utilization efficiency of light can be enhanced.

What is claimed is:

1. A projection display system comprising:
   a light source device including a light source that emits a laser beam and a first enclosure that accommodates the light source; and
   a projection device including a light modulating element that modulates the laser beam based on image information to generate an optical image corresponding to the image information, a projection optical system that projects the optical image on a projection plane, and a second enclosure that accommodates the light modulating element and the projection optical system, wherein
   at least one of the first and second enclosures is a structure having at least two members joined to each other, and
   the structure has a light blocking structure having a convex portion formed on one of the members engaged with a concave portion formed on the other member at each joint between the members.

2. The projection display system according to claim 1, wherein the light source device includes a synthesizing unit that synthesizes laser beams of different colors emitted from a plurality of light sources that have different emission colors, respectively, and causes synthesized light to enter the projection device.

3. The projection display system according to claim 2, wherein the convex portion and the concave portion abut on each other at the joint inside of the enclosure.

4. The projection display system according to claim 1, wherein the convex portion and the concave portion abut on each other at the joint inside of the enclosure.

5. A projection display system comprising:
   a light source that emits a laser beam;
   a light modulating element that spatially modulates the laser beam based on image information to generate an optical image corresponding to the image information;
   a projection optical system that projects the optical image on a projection plane; and
   an enclosure that accommodates the light source, the light modulating element, and the projection optical system, wherein
   the enclosure is a structure having at least two members joined to each other, and
   the structure includes a light blocking structure having a convex portion formed on one of the members engaged with a concave portion formed on the other member at each joint between the members.

6. The projection display system according to claim 5, wherein the convex portion and the concave portion abut on each other at the joint inside of the enclosure.

* * * * *

UNITED STATES PATENT AND TRADEMARK OFFICE
CERTIFICATE OF CORRECTION

| | |
|---|---|
| PATENT NO. | : 8,348,439 B2 |
| APPLICATION NO. | : 12/849447 |
| DATED | : January 8, 2013 |
| INVENTOR(S) | : Taisuke Murata |

It is certified that error appears in the above-identified patent and that said Letters Patent is hereby corrected as shown below:

ON THE TITLE PAGE:

At item (73), Assignee, change:

"(73) Assignee: Mitsubishi Electric Corp., Tokyo (JP)"

to

--(73) Assignee: Mitsubishi Electric Corporation, Tokyo (JP)--.

Signed and Sealed this
Seventh Day of May, 2013

Teresa Stanek Rea
*Acting Director of the United States Patent and Trademark Office*